B. C. BLIVEN.
GREASE GUN.
APPLICATION FILED FEB. 26, 1921.
1,400,207.
Patented Dec. 13, 1921.
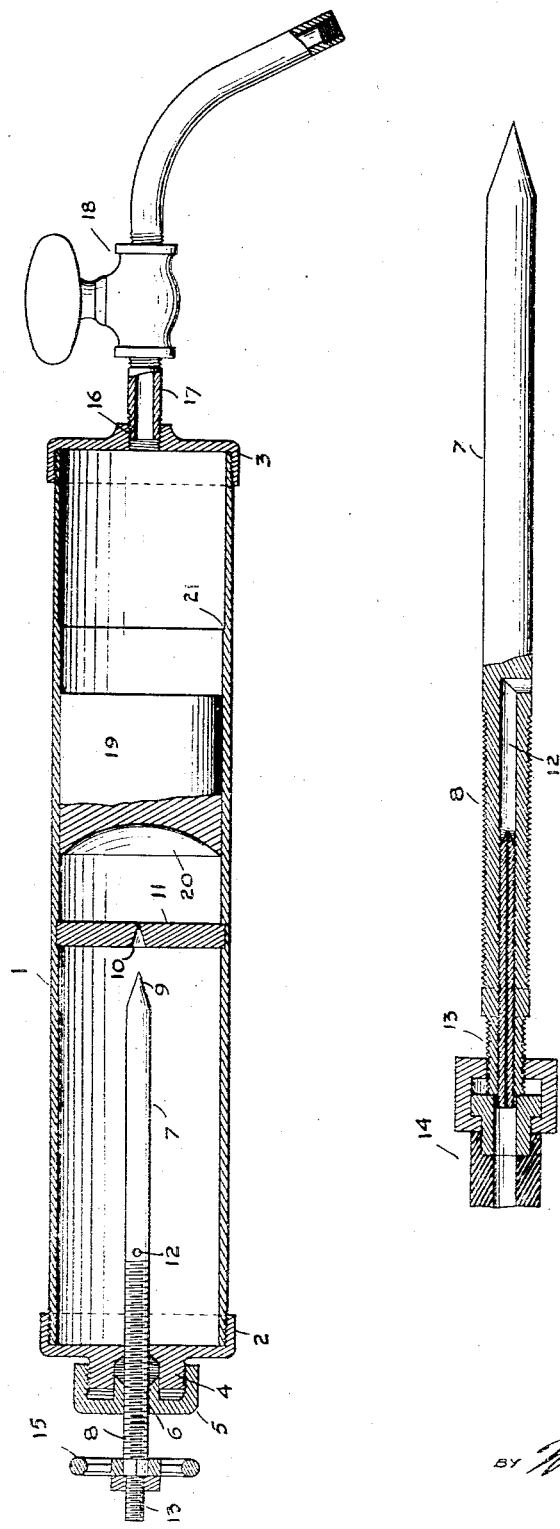
INVENTOR
B. C. BLIVEN
BY Wright & Chumm
ATT'YS.

UNITED STATES PATENT OFFICE.

BERTRAND C. BLIVEN, OF SAN FRANCISCO, CALIFORNIA.

GREASE-GUN.

1,400,207.  Specification of Letters Patent.  Patented Dec. 13, 1921.

Application filed February 26, 1921. Serial No. 448,155.

*To all whom it may concern:*

Be it known that I, BERTRAND C. BLIVEN, a citizen of the United States, residing at San Francisco, in the county of San Francisco and State of California, have invented new and useful Improvements in Grease-Guns, of which the following is a specification.

This invention relates to improvements in grease guns for applying grease and other heavy lubricants under pressure to machinery, especially to the differential, transmission devices and other ordinarily inaccessible parts of automobiles.

The primary object of the invention is to provide a simply constructed, inexpensive and reliable grease gun of the character described which may be operated by compressed air in a simple and effective manner and so that the pressure of the air may be regulated as desired whereby the amount of grease forced out of the gun will be also regulated.

Another object of the invention is to generally improve and simplify construction and operation of the grease guns of the character described so as to render them less expensive as to construction and provide for use thereof without undue waste of grease, there being provided novel and easily operatable means for regulating the pressure of the air whereby the amount of grease expelled or discharged may be regulated to meet the particular requirements of the greasing or lubricating operation at hand.

A great difficulty attending the use of the ordinary grease gun results from the introduction of compressed air under high pressure into the gun. This causes too much grease to be forced out, whereby undue waste thereof results and is apt to cause bursting of the gun. As hereinbefore stated the gun of this invention contemplates the elimination of such objections in grease guns and prevents the waste of compressed air.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:—

Figure 1 represents a longitudinal sectional view of the grease gun constructed in accordance with this invention.

Fig. 2 represents an enlarged sectional view of the air control valve.

Referring to the preferred embodiment of the invention, as illustrated in the accompanying drawings, there is provided a cylinder 1 which is closed at its ends by flanged removable caps 2 and 3 screwed in place after the manner well known in the art. The cap 2 is provided with a central apertured boss 4 upon which a flanged cap 5 is mounted, said boss and cap 5 being screw threaded. The cap 5 has an aperture 6 centrally thereof, which aperture is screw threaded and receives a needle valve 7. The valve 7 is provided with a screw threaded portion 8 which coöperates with the screw threads in the aperture 6. The inner end of said valve is pointed as at 9 and adapted to engage in a conical seat or aperture 10 formed through a disk or partition plate 11 fixed in any suitable manner within and intermediate the ends of said cylinder. The valve has an air passage 12 therein opening at the outer end thereof and at a point in its side, within the cylinder 1. The other end of the valve 7 is provided with a nipple portion 13 through which the passage 12 extends and said nipple is adapted for connection with an air hose 14 such as is used for supplying compressed air to pneumatic tires. The air hose is preferably of the type provided with a valve which opens automatically when applied to said nipple portion 13. A disk like handle 15 is fixed upon the outer end of the valve 7 and when turned provides for longitudinal adjustment of the valve so as to change relation of the pointed end thereof to the seat 10 whereby the opening 10 may be closed or partly opened as desired.

The other cap 3 has a central apertured boss 16 into which is screwed a spout or tube 17 for directing the grease to any spot desired. Preferably there is provided a suitable valve 18 in the spout 17 whereby the flow of grease or heavy lubricant may be regulated as desired.

Mounted within said cylinder 1 is a plunger 19 provided with a concavity 20. If the rear end of the plunger were made flat, the aperture 10 through the disk 11 would be nearly closed when the plunger moved into its rearmost position and the air flowing through the aperture would not have sufficient force to move the plunger and grease in front thereof. By reason of the concavity the air issuing from the aperture will be applied to all parts of the plunger so as to furnish sufficient power to readily move the plunger and grease. This arrangement provides for the full utilization of the space in the cylinder between the front end of the plunger and the cap 3 for holding of grease to be expelled.

The plunger fits closely in the cylinder except at its front end where the cylinder is milled out or enlarged circumferentially, interiorly, as shown at 21, so as to be of larger internal diameter at such point, than at the remainder of the cylinder. This will permit the air to escape around the plunger and out through the spout when all the grease has been expelled and the plunger is in the milled out part of said cylinder. Otherwise, there would be danger of bursting the cylinder owing to the high pressure, more than 100 lbs. to the square inch, of the compressed air that would be confined therein.

To fill the cylinder the cap 3 is removed and the grease or other heavy lubricant is placed or packed in the cylinder with the plunger moved rearwardly and engaging the disk 11. The cap 3 is then screwed back onto the cylinder and the gun is ready for operation. By attaching an air hose to the nipple 13, the air will be forced through the passage 12 in the valve 7 into the chamber provided between the cap 2 and disk 11. By adjusting the valve 7 the operator may regulate the amount of air passing through the opening 10 and thereby control the forward movement of the plunger 19 and the amount of grease expelled. As the plunger moves, the grease in front thereof is expelled through the spout 17. By adjusting the valve 18 the flow of grease or lubricant may be regulated as desired.

The cylinder is preferably made to hold sufficient grease for one complete lubrication of the differential and transmission mechanism, and is, therefore, of such a size that if made strong enough to resist the full force of the air, it would be so heavy as to be burdensome and unwieldy to the operator. I have preferred to make it of lighter construction and to avoid the danger of bursting, I have provided the milled out portion which allows the air to flow around the plunger and out through the spout when all of the grease has been expelled therefrom.

I claim:—

1. A grease gun comprising a cylinder, a plunger in said cylinder, caps at the ends of said cylinder, a grease expelling spout attached to one of said caps, a partition within the cylinder at a point spaced from but adjacent to one end therein, said partition having an opening extending therethrough, a valve extending through the other cap and movable into and out of said opening to regulate the flow of air through the opening, said valve having a passage extending therethrough and opening at one end into the cylinder and at its other end at the outer end of the valve and means for providing for connection of a compressed air hose to the outer end of the valve so as to inject air into the cylinder.

2. A grease gun comprising a cylinder, a plunger in said cylinder, caps at the ends of said cylinder, a grease expelling spout attached to one of said caps, a partition within the cylinder at a point spaced from but adjacent to one end therein, said partition having an opening extending therethrough, a valve extending through the other cap and movable into and out of said opening to regulate the flow of air through the opening, said valve having a passage extending therethrough and opening at one end into the cylinder and at its other end at the outer end of the valve, means for providing for connection of a compressed air hose to the outer end of the valve so as to inject air into the cylinder and means for adjusting said valve.

3. A grease gun comprising a cylinder, a plunger in said cylinder, caps at the ends of said cylinder, a grease expelling spout attached to one of said caps, a partition within the cylinder at a point spaced from but adjacent to one end therein, said partition having an opening extending therethrough, a valve extending through the other cap and movable into and out of said opening to regulate the flow of air through the opening, said valve having a passage extending therethrough and opening at one end into the cylinder and at its other end at the outer end of the valve, means for providing for connection of a compressed air hose to the outer end of the valve so as to inject air into the cylinder, means for adjusting said valve and a valve in the spout for controlling the passage of grease therethrough.

4. A grease gun comprising a cylinder, a plunger in said cylinder, caps at the ends of said cylinder, a grease expelling spout attached to one of said caps, a partition within the cylinder at a point spaced from but adjacent to one end therein, said partition having an opening extending therethrough, a valve extending through the other cap and movable into and out of said opening to regulate the flow of air through the opening, said valve having a passage extending therethrough and opening at one end into the cylinder and at its other end at the outer end of the valve and means for providing for connection of a compressed air hose to the outer end of the valve so as to inject air into the cylinder said cylinder having the end thereof remote from said valve, enlarged circumferentially, interiorly to permit air to escape around the plunger and out through the spout when the grease has been expelled from the cylinder.

BERTRAND C. BLIVEN.